United States Patent

Nakanuma et al.

[15] 3,665,423

[45] May 23, 1972

[54] MEMORY MATRIX USING MIS SEMICONDUCTOR ELEMENT

[72] Inventors: Sho Nakanuma; Tohru Tsujide; Toshio Wada; Ryo Igarashi; Katsuhiro Onoda, all of Tokyo, Japan

[73] Assignee: Nippon Electric Company, Ltd., Minato-ku, Tokyo, Japan

[22] Filed: Mar. 13, 1970

[21] Appl. No.: 19,217

[30] Foreign Application Priority Data

Mar. 15, 1969 Japan....................................44/20670

[52] U.S. Cl. ...........................340/173 R, 307/238, 307/279

[51] Int. Cl..........................................................G11c 11/40

[58] Field of Search .................340/173 R, 173 FF; 307/238, 307/279

[56] References Cited

UNITED STATES PATENTS 3,508,211 4/1970 Wegener...............................340/173

*Primary Examiner*—Terrell W. Fears

*Attorney*—Sandoe, Hopgood and Calimafde

[57] ABSTRACT

A memory matrix device is disclosed in which an MIS semiconductor element is employed as the memory element. The semiconductor element has an insulating film disposed between the semiconductor substrate and conductor electrode. That film contains capture centers which capture electrons upon the application of a voltage exceeding a critical value across the electrode and substrate.

6 Claims, 14 Drawing Figures

*INVENTORS*
SHO NAKANUMA
TOHRU TSUJIDE
TOSHIO WADA
RYO IGARASHI
KATSUHIRO ONODA

*by*

Sandoe, Hopgood & Calimafde
ATTORNEYS

INVENTORS
SHO NAKANUMA
TOHRU TSUJIDE
TOSHIO WADA
RYO IGARASHI
KATSUHIRO ONODA
by
Sandoe, Hopgood & Calimafde
ATTORNEYS

*INVENTORS*
SHO NAKANUMA
TOHRU TSUJIDE
TOSHIO WADA
RYO IGARASHI
KATSUHIRO ONODA
*by*
Sandoe, Hopgood & Calimafde
ATTORNEYS

*INVENTORS*
SHO NAKANUMA
TOHRU TSUJIDE
TOSHIO WADA
RYO IGARASHI
KATSUHIRO ONODA
*by*
Sandoe, Hopgood & Calimafde
ATTORNEYS

MEMORY MATRIX USING MIS SEMICONDUCTOR ELEMENT

The present invention relates to memory matrices using semiconductor memory elements having memory function, and, more particularly to a, non-destructive readable word arrangement type matrix in the form of an integrated circuit.

Known conventional memory devices having memory function include magnetic memory devices, associative memory devices utilizing bistable flip-flop circuits, and memory devices using insulated gate type semiconductor elements (hereinafter referred to as MIS semiconductor elements) having metal-insulator-semiconductor structure (hereinafter referred to as MIS structure) in which the hysteresis characteristics of the capacity-voltage characteristics of silicon-nitride are utilized.

Among these memory devices the magnetic memory device is not preferred as a large scale memory device in which high speed is required, because of its difficulty of read out at high speed, complexity of providing connection to the peripheral electronic circuits, and difficulty of microminiaturization. Bipolar integrated circuits are used in high speed memory device and insulated gate field effect integrated circuits (hereinafter referred to as MIS integrated circuits) are used in large capacity memory device wherein the draw-backs of magnetic memories are largely overcome inferiority as described above is improved. In a bipolar integrated circuit an epitaxial layer is formed on a silicon substrate of one conductivity type and circuit elements such as transistors, diodes and/or resistors are formed on the epitaxial layer and electrically isolated from each other by a diffused layer of the same conductivity type as the silicon substrate, while the epitaxial layer is of the opposite conductivity type. The bipolar integrated circuits are fabricated through a number of diffusion and various other processes wherein the final yields are inevitably low. The bipolar integrated circuits have such defective characteristics that a considerable portion of the epitaxial surface area is occupied by the isolation region and many components are required in a unit function. On the other hand in the MIS integrated circuits in which insulated gate field effect transistors are used, the isolation region is not required and hence a higher integration density may be obtained in bipolar integrated circuits while the electronic circuits are similar to those of the bipolar integrated circuits and the number of components is not reduced. For example, a flip flop circuit which performs as a one bit memory cell in an integrated circuit consists of two active elements, two load elements and two interfacing elements with external circuits, or a total of six circuit elements. It is a serious defect for a semiconductor device that the number of required components is high in realizing a large scale integrated circuit, increasing the capacity of its function and improving its reliability and yields. Another defect of such integrated circuits is that the stored information is completely destroyed if the power supply is cut off. It is desirable for a low power memory or a high speed read only memory in which a wide range of application is expected that the stored information is conserved when the power supply is cut off.

In order to reduce the number of components required for a unit function much has been expected in the MIS semiconductor devices using silicon nitride as the gate insulation layer which has hysteresis characteristics in its capacity-voltage curve. Applied Physics Letters, vol. 12, No. 8, pp 260–263 is referred for the application of MIS semiconductor device as a memory element. In this MIS semiconductor device the surface charge density distribution directly under the insulated gate film in influenced by applying a voltage above a threshold value across the metal electrode and semiconductor substrate of the MIS structure, thereby maintaining a predetermined surface charge density for a predetermined period of time. The maintenance of surface charge density in the MIS structure is given rise to by the electrons injected into the silicon nitride film and captured by the temporary capture center existing therein, and is destroyed easily by applying voltage of an opposite sense across the metal electrode and semiconductor substrate or spontaneous discharge.

In the memory element of an MIS semiconductor device using the hysteresis of this silicon nitride film, the reduction in the number of circuit elements required in a unit function enables an increase in the capacity of function; however, as the captured electrons easily escape from the capture center due to an external electric field thereby, deteriorating the memory stability or reproducibility, practical application is almost impossible. The increment of voltage transferred by the memory is small and the noise margin and output signal are both low.

Therefore, it is an object of the present invention to provide a memory device having high reliability and integration density with stable memory function.

It is another object of the present invention to provide a high speed memory device with advantageous electrical characteristics having an extremely simple structure which is suitable for mass production.

It is still another object of the present invention to provide a semiconductor memory device in the form of an integrated circuit wherein a given information may be stably stored for a desired period of time.

The present invention is based upon new knowledge that negative charges are stably stored within a certain insulating material upon the application of a voltage above a critical value. Such a phenomenon may be explained by hypothesizing the existence of permanent capture centers which semipermanently capture electrons injected into the insulating material. A call for such a novel capture center enables a clear distinction from a temporary capture center in silicon nitride or the like from which an electron easily escapes upon the application of an opposite electric field. In an MIS semiconductor device an insulating material having such permanent capture center is employed as the insulating gate film. The capacity-voltage curve of the device significantly shifts toward a predetermined direction along the voltage axis when voltage above a threshold value is applied to the gate electrode, wherein the threshold value is independent of the polarity or type of current such as direct or alternating current, and the transferred characteristics are stable and not restorative when followed by the application of an electric field.

The present invention provides a memory matrix device using as the memory element an MIS semiconductor element having an insulating material disposed between the semiconductor substrate and the conductor electrode containing permanent capture centers which capture electrons semipermanently upon the application of an electric field above a critical value, wherein the row and column lines of the matrix are electrically connected with the two electrodes. The connection of row and column lines is realized by applying write drive signals across row and column lines thus causing capture of electrons within the insulating gate film. The row and column lines are disposed such that output signals are obtained from the column lines by applying read signals at row lines or word lines. The row and column lines of the word arrangement type memory device are designated as word and digit lines, respectively, wherein either write or read drive signals are applied at the word lines. Drive signals are applied across the digit line and word line during write cycles and output signals are read at the digit lines during read cycles. The memory device in accordance with the present invention is preferably provided with a plurality of MIS structures within a common semiconductor substrate wherein electrons are injected into the insulating material film of a predetermined MIS structure within the matrix selected by the application of a drive signal across a particular set of row and column lines, thereby causing a significant storage of negative charges in the insulating film due to the capture of electrons.

The memory device in accordance with the present invention is provided with a large capacity of functional integration density while the number of circuit elements required in a unit function is reduced by using an MIS semiconductor element of simple structure. The extremely simple structure enables high production yields and high reliability of the resulting device. The memory device in accordance with the present invention also provides high noise immunity due to the significant number of charges stored in the semiconductor element upon the application of drive signals in excess of a predetermined critical voltage, and semipermanent memory with good stability due to the secure capturing of injected electrons at the capture centers. Such a memory device is extremely useful in practical application in that electrons are injected into the gate insulating film either from the conductor electrode or semiconductor substrate and the capture of injected electrons is independent of the polarity of the applied signal, enabling thereby an easy write operation.

The present invention will be described hereinafter referring to the embodiments described in the accompanying drawings for a better understanding of the above characteristics and advantages of the memory device.

FIGS. 1A and 1B graphically illustrate the capacitance-applied voltage characteristics of MIS-type devices for explaining the principles of operation of the invention;

FIG. 2 is a cross-sectional view of an MIS transistor memory device according to one embodiment of the invention;

FIGS. 3A and B graphically illustrate the static characteristics of the device of FIG. 2;

Figure 6:
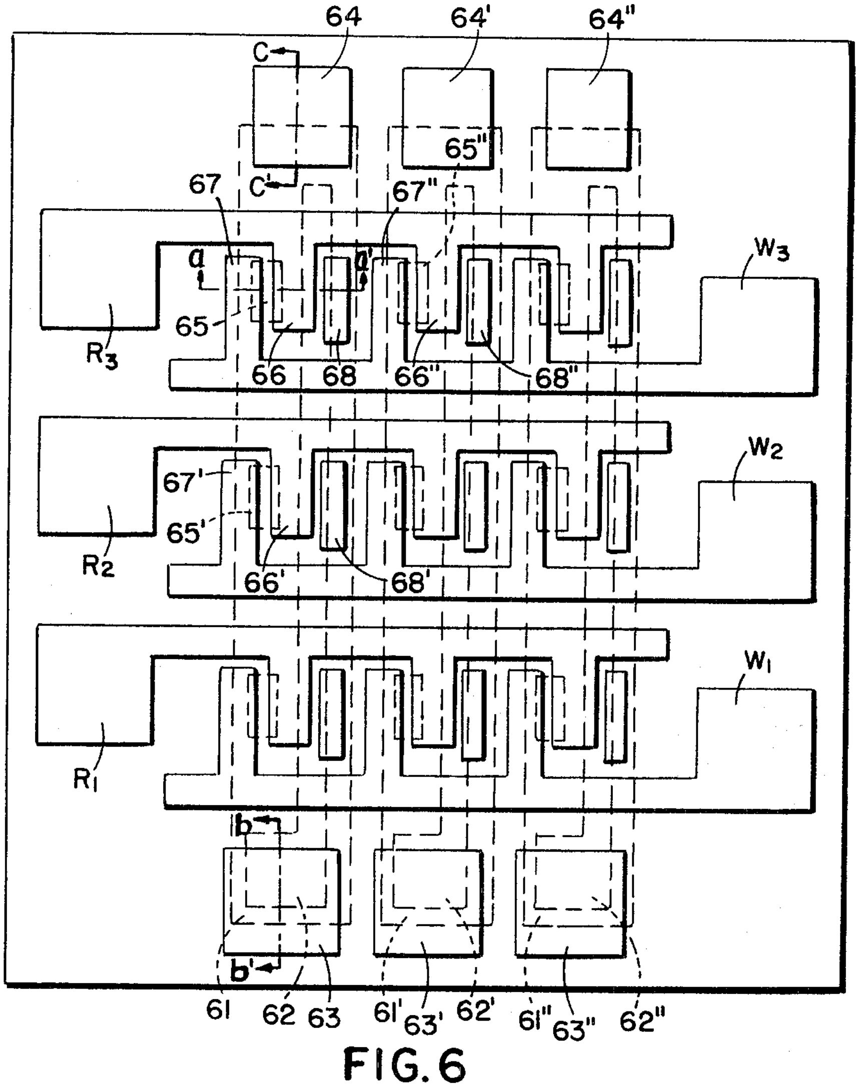
FIG. 6 is a plan view of third and fourth embodiments of the invention.
Figure 8A:
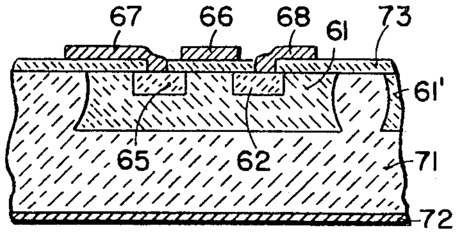
Figure 8B:
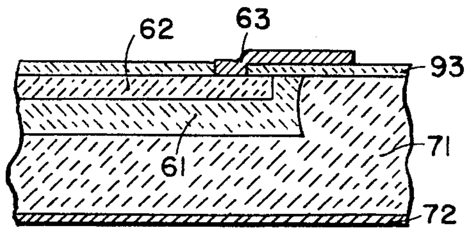
Figure 8C:
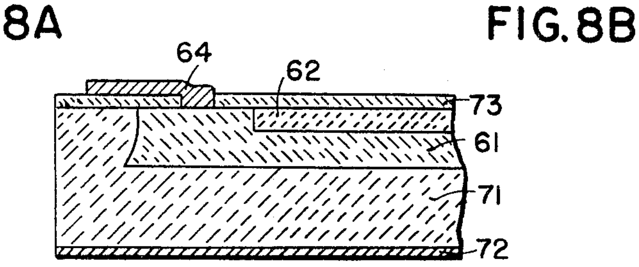
Figure 9:
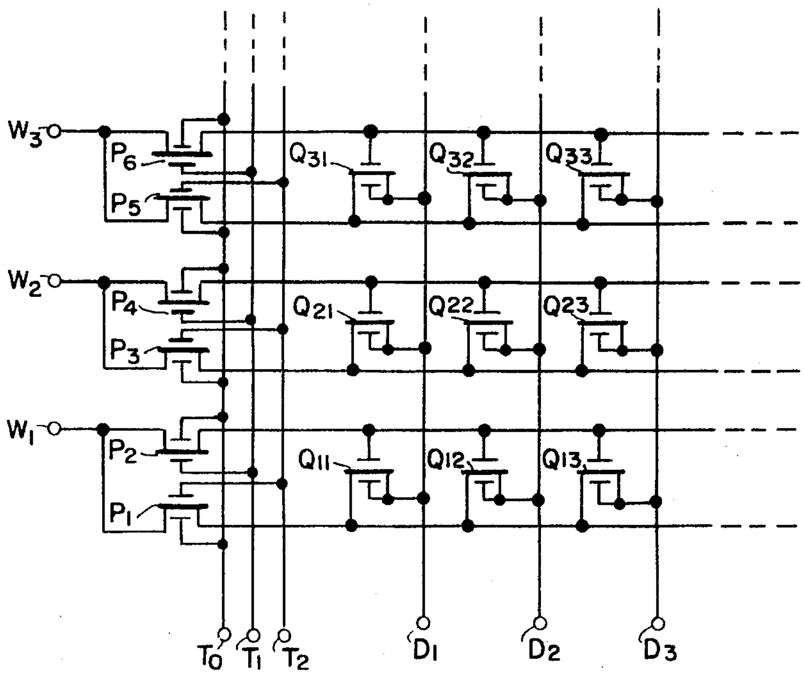

FIGS. 8A, 8B, and 8C are cross-sectional views of the fourth embodiment of the invention respectively taken across lines *a—a'*, *b—b'* and *c—c'* in FIG. 6; and FIG. 9 is a schematic circuit diagram of a fifth embodiment of the invention.

Figure 1A:
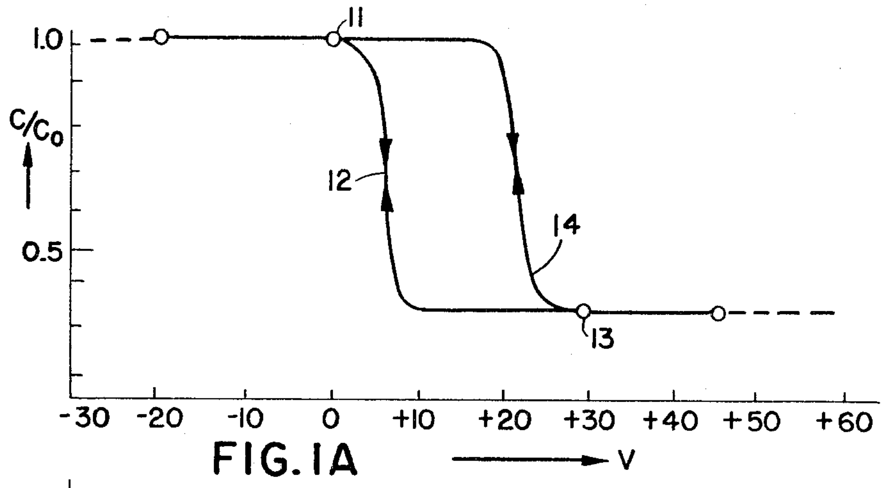
Figure 1B:
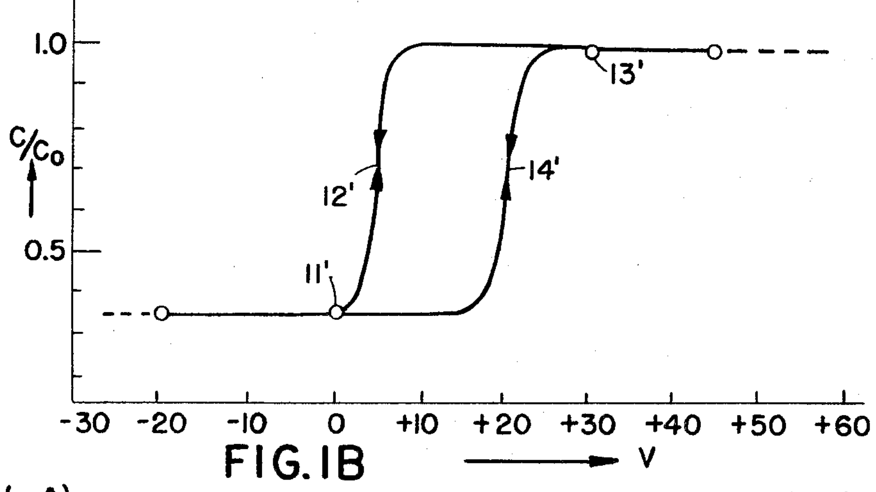

Referring to FIGS. 1A and 1B, the capacity-voltage characteristic curves are shown of MIS structures formed by sequentially depositing alumina film containing a permanent capture center and an aluminum electrode onto a p-type silicon substrate having 2 ohm-cm resistivity and an n-type silicon substrate having 1 ohm-cm resistivity, respectively. Shown in FIGS. 1A and 1B are the characteristics of the two structures, respectively, with C/Co being plotted along the ordinate and applied voltage V across the aluminum electrode and silicon substrate being plotted along the abscissa wherein C/Co is the capacity of the MIS structure normalized by the capacity Co due to the insulating film alone. The alumina film on the device has thickness of 1,800 A and is formed through vapor growth by introducing a mixture of 0.5 mol. percent aluminum chloride gas, 1.5 mol. percent carbon dioxide, and 98 mol. percent hydrogen over a silicon substrate heated at 850° C. The critical voltage required for the permanent capture center within the alumina film of such an MIS structure to capture electrons is + 40 volts or − 20 volts applied to the aluminum electrode with the silicon substrate at 0 volt.

The capacity-applied voltage characteristics shown in FIG. 1A is obtained by varying the voltage below critical values between + 30 and − 15 volts across the aluminum electrode and the silicon substrate of a sample in storage state 11 at 0 bias voltage, and above critical values between + 70 volts and − 35 volts. When the voltage is increased positively from the initial state 11, an inversion state indicated at 13 is reached after the initial curve 12, and when the voltage is decreased after a few minutes to below the critical value, the initial state 11 is restored via the curve 12. Therefore, it is understood that electrons are not captured in the alumina film at 30 volts. When the voltage is decreased and kept at − 15 volts and increased again to the inversion state 13, the initial curve 12 is obtained. However, when the sample is kept at + 70 volts or − 35 volts for approximately 1 minute, the characteristic curve is transferred toward positive direction by approximately 20 volts and a curve 14 is obtained in either case. The obtained characteristics are extremely stable and are reproducible between 0 and + 30 volts. The upper limit of transfer of the characteristic curve is approximately + 200 volts in the above described sample, and the magnitude of transfer above the critical voltage and up to the upper limit depends on the applied voltage and time during which the sample is held at the maximum voltage. Since the characteristics obtained after transfer are so stable that the curve is distinctive from the initial curve. The noise immunity may be sufficiently increased by transferring the curve as desired.

FIG. 1B shows the capacity-applied voltage characteristic of an MIS structure using an n-type silicon substrate, wherein an inversion state 11', initial characteristic curve 12', storage state 13', and characteristic curve 14' are obtained by applying voltage in the same manner as in the sample of FIG. 1A.

Figure 2:
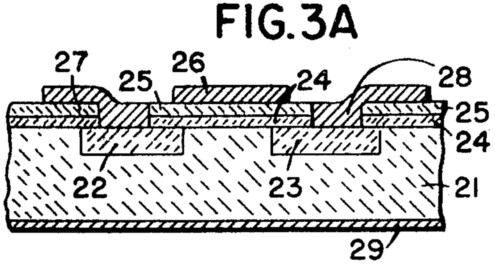

Referring now to FIG. 2, an MIS transistor is described using as the gate insulating film an insulating film having the capacitance-voltage characteristics shown in FIGS. 1A and 1B, wherein a silicon substrate 21 of one conductivity type has a drain region 22 and a source region 23 with opposite conductivity type vapor diffused therein. A thin silicon dioxide film 24 and an alumina film are 25 deposited on substrate 21, a gate electrode 26 is formed on the insulating film, and interconnections 27 and 28 form ohmic contacts with the drain and source regions 22 and 23, respectively. A substrate gate electrode 29 ohmic-contracts the bottom side of the substrate 21. The alumina film 25 is vapor grown as described in conjunction with FIG. 1B and has a thickness of 1,800 A. The silicon dioxide film 24 may be formed by thermal oxidation or vapor deposition and has a thickness in the range of 0 – 580 A. The channel length and width of the transistor used in measuring the transfer characteristics are 7 $\mu$ and 300 $\mu$, respectively.

Figure 3A:
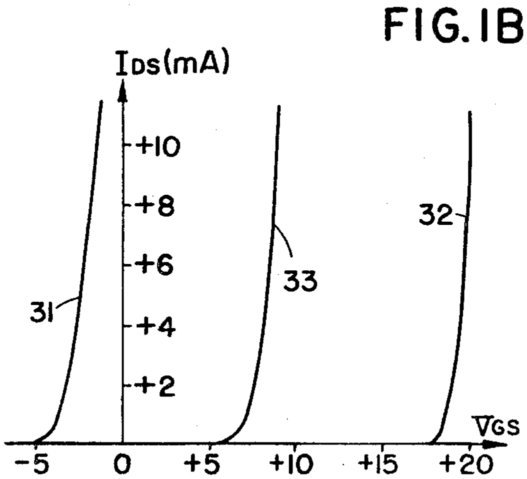

FIG. 3A illustrates n-channel operation of a transistor of the type shown in FIG. 2 using p-type silicon substrate 21 having a resistivity of 2 ohm-cm, wherein the ordinate represents drain current $I_{DS}$ and abscissa represents gate voltage $V_{GS}$. During the measurement the voltage across drain and source is held at 15 volts. A curve 31 represents the characteristics of a transistor having 200 A of silicon dioxide 24, wherein the gate voltage is kept below critical value, and a curve 32 shows the characteristics of the same transistor after the gate voltage has been increased above the critical value. A curve 32 represents the characteristics of the same transistor after the application of 50 volts AC at a commercial frequency for approximately 20 seconds across the gate electrodes 26 and 29, thereby injecting electrons into the permanent capture centers of the alumina film 25. Since the operation of such an MIS transistor may be transferred from depletion region to enhancement region by applying an external electric field, i.e., the transistor operating in depletion region, or along the curve 31, may be transferred to operate in enhancement region, or along the curve 32. Such performance is preferable in the associative memory element or unit memory element of a memory matrix using the bistable characteristics of the conventional electronic circuit. As the information once written is not destroyed during the electrical operation for reading the information, it provides a miniaturized integrated circuit having high reliability. The characteristics of an n-channel MIS transistor in the initial state when the silicon dioxide is removed is represented by a curve 33 in enhancement region. In this MIS transistor having a simpler structure the operating characteristics with higher gate threshold voltage is obtained by captured electrons in the alumina film. As a result various memory devices may be realized by providing gate biasing between the initial and transferred characteristics.

Figure 3B:
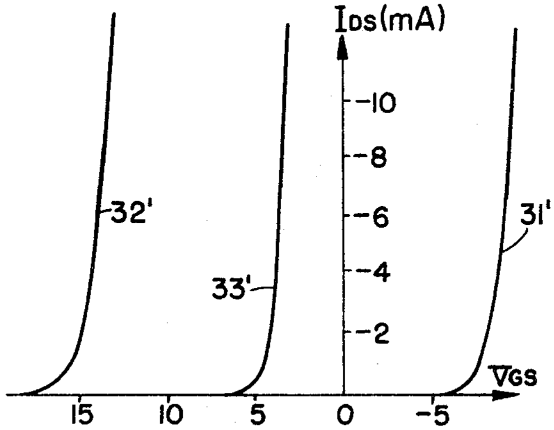

FIG. 3B shows the relation between drain current $I_{DS}$ and gate voltage $V_{GS}$ of a p-channel insulated gate field effect transistor using an n-type silicon substrate having 1 ohm-cm resistivity. Curves 31', 32', and 33' are the characteristics at initial, after application of 50 volts AC, in excess of critical value, and without silicon dioxide, respectively.

Figure 4:
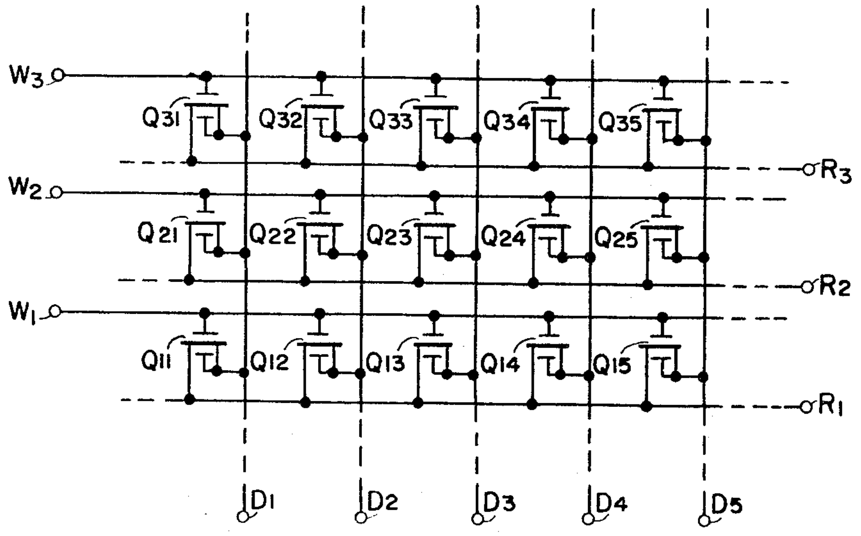
FIG. 4 is a schematic circuit diagram of a first embodiment of the invention.

Referring now to FIG. 4, the first embodiment of the present invention will be described. The first embodiment is a semiconductor memory device wherein gate electrodes, drain electrodes, source and substrate gate common electrodes of MIS transistors $Q_{11}$, $Q_{12}$, $Q_{21}$, .... are connected, respectively, write row lines $W_1$, $W_2$, $W_3$, .... and read row lines $R_1$, $R_2$, $R_3$, .... are intersected by write-read column lines $D_1$, $D_2$, $D_3$, .... forming a matrix line, and the MIS transistor uses as a gate insulating film an insulating material having permanent capture centers at the predetermined intersections of the rows and columns. The MIS transistors $Q_{11}$, $Q_{12}$, $Q_{21}$ .... are of the p-channel type. The write operation into the transistor $Q_{22}$, for example, is achieved by applying a positive voltage across write row line $W_2$ and column line $D_2$ with the row line being more positive. According to such application of voltage the gate and substrate electrodes of the transistor $Q_{22}$ connected to the row line $W_2$ and column line $D_2$, respectively, provide an electric field in the gate insulating film in excess of the critical value, resulting in electrons being captured within the insulating film. Due to the captured electrons the transistor $Q_{22}$ located at the intersection of the row and column lines $W_2$ and $D_2$, respectively, will have operating characteristics in deplection region with significantly high gate threshold voltage as shown in FIG. 3B. Such a write operation will take place for all predetermined intersections in a similar manner.

The read operation in the embodiment of FIG. 4 is performed by applying a gate biasing voltage between gate threshold voltages before and after the transfer of the MIS transistor at predetermined row lines, and providing read lines of the same row with read signal, thereby performing linear selection. In order to prevent signal detouring a deep biasing voltage is applied to such row lines in which data are not to be written, wherein the deep bias is sufficient to cut off such transistors that are transferred. When the transistor $Q_{22}$, alone for example, among the transistors $Q_{21}$, $Q_{22}$, $Q_{23}$, .... of which the drain electrodes are connected to the read row line $R_2$ has transferred characteristics, the drive signal applied to the read row line $R_2$ gives rise to an output signal at output column line $D_2$ alone via p-channel of the conducting transistor $Q_{22}$.

In this embodiment a unit memory function consists of only one MIS transistor, thereby improving the capacity of function as much as 6-fold compared with the conventional integrated memory circuit with the same semiconductor substrate size, and also increasing the reliability because of its simple structure. The distinctive gate threshold voltages of the transferred and initial states provide sufficient noise immunity, and high speed reading is feasible since the read current is not affected by the stray capacitance of the gate circuit. It is needless to say that the transistors in this embodiment may be n-channel, in which case the operation is reversed.

Figure 5:
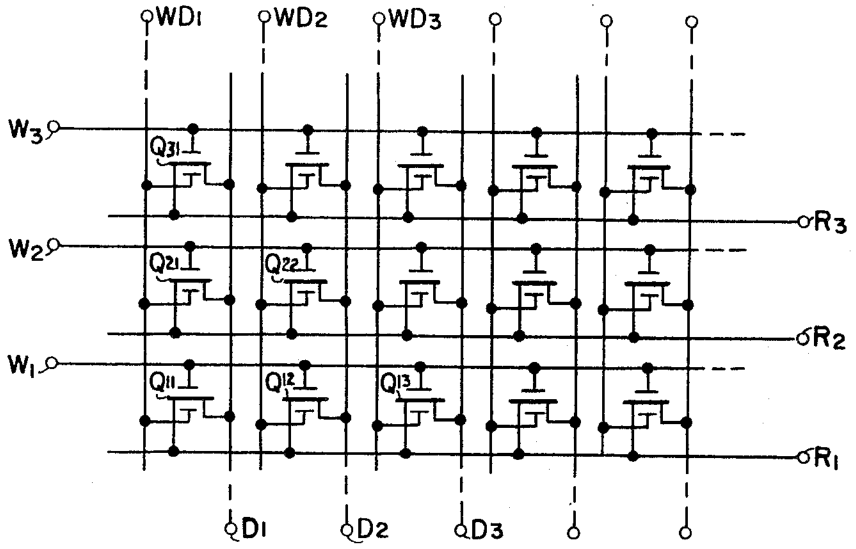
FIG. 5 is schematic circuit diagram of a second embodiment of the invention.

The second embodiment of the present invention will now be described referring to FIG. 5. The substrate gate electrode of each MIS transistor in each column is connected respectively to the write column lines $WD_1$, $WD_2$, $WD_3$, .... It is preferred in the second embodiment that the write operation be performed by applying a gate voltage in excess of critical value at a selected pair of the write row lines $W_1$, $W_2$, $W_3$, .... and write column lines $WD_1$, $WD_2$, $WD_3$, ..... The read operation is performed by detecting conduction and non-conduction of the current path at the pair of read row and column lines $R_i$ and $D_i$ which are connected to the drain and source electrodes of the selected transistor, while the gate electrodes of the transistors at selected intersections of the matrix are held at predetermined gate biasing voltage through the write row and column lines connected to the respective gate electrode.

While in the second embodiment interconnection is more complex in constructing a matrix, an additional degree of freedom in write and read of information enables either linear selection or current coincidence.

FIG. 6 shows a layout of an integrated circuit structure of the second embodiment, wherein solid lines outline the surface metal interconnection and broken lines indicate each semiconductor region. The metal interconnections are write row lines $W_1$, $W_2$, and $W_3$ and read row lines $R_1$, $R_2$, and $R_3$ deposited on the upper face of insulating film which, in turn, is deposited on the surface of the semiconductor substrate. In this embodiment are used as column lines semiconductor regions 61, 61' and 61'' of opposite conductivity type formed perpendicular to the row lines in the semiconductor substrate of one conductivity type, and source regions 62, 62' and 62'' of one conductivity type formed in the semiconductor regions are used as column lines. These regions enable intersection without the expense of multi-metal layer interconnection, with each row line underpassing at each intersection. External connection around the periphery of semiconductor substrate through read electrodes 63, 63', and 63'' and write electrodes 64, 64' and 64'' are provided as required. Formation of the surface interconnection using a single metallization improves yields significantly. MIS transistors are formed at the intersections of each row and column lines as follow: rectangular regions 61, 61' and 61'' of opposite conductivity type are semiconductor substrates common to each column, regions 62, 62', and 62'' of one conductivity type are source regions common to each column, and regions 65, 65' and 65'' of one conductivity type formed parallel to the source region at each intersection in the semiconductor region 61, 61' and 61'' are drain regions. Within the insulating film coating the surface of the semiconductor substrate permanent capture centers are contained as previously described, and fingers 66, 66'' and 66'' of the read interconnections $R_1$, $R_2$, and $R_3$ operate as gate electrodes extending between the source and drain regions over the insulating film. The fingers 67, 67' and 67'' extending from the write interconnections $W_1$, $W_2$, and $W_3$ to drain regions 65, 65' and 65'' of each MIS transistor are drain electrodes. On the source regions 62, 62' and 62'' which are common to each column are formed source electrodes 68, 68' and 68''. These source electrodes are merely for internal connections and are not for external connection.

Figure 7A:
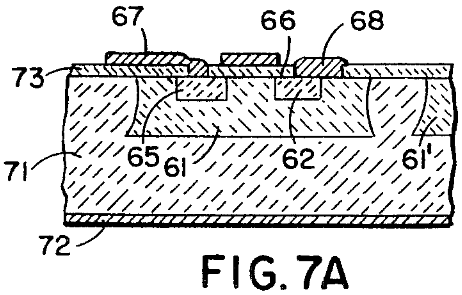
FIGS. 7A and 7B are cross-sectional views of the third embodiment respectively taken across lines *a—a'* and *b—b'* of FIG. 6.
Figure 7B:
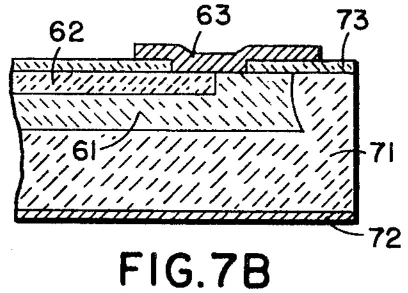

FIG. 7A is a cross sectional view sectioned along the line *a—a'* of FIG. 6 and FIG. 7B is a cross sectional view sectioned along the line *b—b'* of FIG. 6, wherein the source electrode 68 short circuits the source region 62 and semiconductor region 61, and the external electrode 63 similarly short circuits the source region 62 and semiconductor region 61. These electrodes ohmically-contact the source region 62 and region 61 for reducing the series resistance of the column line. As shown in these drawings, the regions 61, and 61' of opposite conductivity type are formed in a semiconductor substrate 71 of one conductivity type, each region electrically being insulated from the others with the pn junction formed between each region and the substrate. Voltage is supplied to the semiconductor substrate 71 through the bottom ohmic-electrode 72 for reverse biasing the pn junctions between each region and the substrate. Aspects of such pn junction isolation and reverse biasing are exactly the same as conventional semiconductor integrated circuits.

In the third embodiment of the present invention the common source region 62 of the MIS transistor in each column and semiconductor region 61, i.e. the semiconductor substrate of MIS transistor, are short circuited, and it is an MIS integrated circuit having the circuit structure shown in FIG. 4. According to the third embodiment an integrated memory circuit may be obtained with large capacity of memory function, higher reliability of operation and good yields.

FIGS. 8A, 8B and 8C show the fourth embodiment of the present invention, which is cross sectioned along the lines a—a', b—b' and c—c' of FIG. 6, respectively. As clearly shown in the cross sectional views of FIGS. 8A–C and in FIG. 6, the ohmic electrode 63 contacting the source region 62 which is common to the column and the external electrode of ohmic electrode 64 contacting the semi-conductor region 61 are separately formed. In accordance with the fourth embodiment a large scale memory device may be obtained having the same circuit structure as shown in FIG. 5. It is needless to say that the common source region 62 corresponds to the read column line $D_1$ and the semiconductor region 61 corresponds to the write row line $WD_1$.

In the third and fourth embodiments described referring to FIGS. 7 and 8, an alumina film 73 of a uniform thickness of approximately 2,000 A is deposited over the entire surface of the semiconductor substrate. The alumina film 73 contains permanent capture centers for electrons within the film as shown in conjunction with FIG. 2, wherein the gate insulating film directly under the gate electrode 66 stores negative charges upon a write operation such that electrons are captured by the centers and surface hole charges of $10^{11} - 10^{13}$ charges/cm$^2$ are induced in the semiconductor region 61. The operation of the embodiment shown in FIGS. 6 through 9 is identical to that in FIGS. 4 and 5.

FIG. 9 shows the fifth embodiment of the present invention, wherein the number of external leads is significantly reduced. In the embodiment of FIG. 4 write lines $W_1$, $W_2$, $W_3$, .... and read lines $R_1$, $R_2$, $R_3$, .... are provided. It is desirable that the number of external terminals of memory devices be reduced by as much as possible. The fifth embodiment is provided with three additional column lines $T_0$, $T_1$ and $T_2$, and transistors $P_1$, $P_2$, $P_3$, $P_4$, $P_5$, $P_6$, ...... which are identical with the MIS transistors constructing the matrix. In this embodiment the read row lines $R_1$, $R_2$, $R_3$, .... and write row lines $W_1$, $W_2$, $W_3$, .... are combined using the transistors $P_1$, $P_2$, $P_3$,...., as shown in FIG. 9. The gate and drain electrodes of each memory element $Q_{11}$, $Q_{21}$, $Q_{31}$, .... are respectively connected to the source electrodes of the transistors $P_2$, $P_4$, $P_6$ ,...... and to the source electrodes of the transistors $P_1$, $P_3$, $P_5$, ..... When a write operation is to be enabled a write command voltage is applied across the electrodes $T_0$ and $T_1$ in order to turn on the transistors $P_2$ , $P_4$, $P_6$, .... thus enabling the write operation through write row lines $W_1$, $W_2$ .... and column lines $D_1$, $D_2$, .... thereby storing information in each memory element. When a read operation is to be enabled, transistors $P_2$, $P_4$, $P_6$ .... are turned off and read command voltage is applied across the electrodes $T_0$ and $T_1$, turning on the transistors $P_1$, $P_3$, $P_5$, .... and a read signal is applied to row lines $W_1$, $W_2$, $W_3$, .... giving rise to output signals from column lines $D_1$, $D_2$, $D_3$, ..... Therefore, the number of external electrodes are reduced significantly and if all transistors $P_1$, $P_2$, $P_3$, .... are turned on and positive pulses below the critical voltage are given as read signal, output signals without detouring are obtained through the column lines with unidirectional current from those memory elements which have information stored. The transistors $P_1$, $P_2$, $P_3$, $P_4$, .... are also memory elements having memory capability. After each memory element $Q_{11}$, $Q_{12}$, $Q_{13}$, .... has information written, a dc or ac voltage above critical value may be applied across the electrodes $T_1$ and $T_0$ and across electrodes $T_2$ and $T_0$ to convert the memory into a read only memory.

In any of the foregoing embodiments the conducting channel of each MIS transistor is selected according to the requirement. Besides the use of alumina as described above other insulating materials such as oxides of titanium, tantalum, molybdenum, zircon, etc. may exhibit similar performance characteristics by storing a large amount of negative charges upon the application of a voltage in excess of a certain critical voltage, and such materials may be used. Although in the foregoing description the column lines are the substrate regions, source regions and drain region each column being common to each line, each transistor may be separately formed, the intersection may be underpassed using a diffused region of opposite conductivity type to that of the source and drain regions, or by using multi-layer metallization.

Although specific embodiments are disclosed in the description herein, it will be understood that the embodiments are for purposes of clarifying the disclosure only and are not to be interpreted as any limitation on the scope of the present invention. Therefore, it will be appreciated that variations of the present invention will be apparent to those skilled in the art and that the present invention will be limited only by the spirits and scope.

What is claimed is:

1. A memory device employing insulated gate field effect memory transistors comprising a first group of row lines, a second group of row lines, a plurality of column lines, and a plurality of insulated gate field effect memory transistors respectively arranged at the intersections of said first group of row lines and said column lines, the gate electrodes of said memory transistors arranged in each of said first group of row lines being commonly connected to the respective ones of said first group of row lines, one of the source and drain electrodes of said memory transistors arranged in each of said second group of row lines being connected in common to the respective ones of said second group of row lines, the other of the source and drain electrodes and the substrate of said memory transistors arranged in each of said column lines being connected in common to the respective ones of said column lines, each of said insulated gate field effect memory transistors having an alumina film as an insulating gate film, said alumina film having the characteristic of exhibiting a storage capability of negative charges upon the application in the gate film of an electric field of a magnitude exceeding a predetermined critical value.

2. The memory device of claim 1, in which said first group of row lines includes a plurality of write row lines, said second group of row lines including a plurality of read row lines said plurality of column lines including a plurality of read column lines and further comprising a plurality of write column lines respectively connected to the substrates of the insulated gate field effect transistors in each of said column lines.

3. The memory device of claim 1, further comprising three additional column lines, and a pair of additional field effect transistors for each of said row lines, the gate electrodes of each of said transistor pairs being respectively connected to two of said additional column lines, said first and second groups of row lines being respectively connected to the output electrodes in both transistors in each of said transistor pairs, the substrates of each of said transistor pairs being connected to the third of said additional column lines.

4. The memory device of claim 3, in which the gate electrodes of said memory transistors in each of said row lines are respectively connected to one of the output electrodes of one transistor in each of said transistor pairs, one output electrode of said memory semiconductor elements in each of said row lines being respectively connected to said one of the output electrodes in the other transistor in said transistor pair.

5. The memory device of claim 4, in which said write row lines are respectively connected to the other output electrode of both transistors in each of said transistor pairs.

6. The memory device of claim 4, in which the other output electrode in each of said memory semiconductor elements are connected respectively to said column lines and to the substrate of said elements.

* * * * *